United States Patent [19]

Foote et al.

[11] Patent Number: 5,557,044

[45] Date of Patent: Sep. 17, 1996

[54] LOW STRESS MAGNET INTERFACE

[75] Inventors: Steven A. Foote, Issaquah; Damon R. Stoddard, Seattle, both of Wash.

[73] Assignee: AlliedSignal, Inc., Morristown, N.J.

[21] Appl. No.: 317,257

[22] Filed: Oct. 3, 1994

Related U.S. Application Data

[63] Continuation-in-part of Ser. No. 184,527, Jan. 19, 1994.

[51] Int. Cl.$^6$ ................................................. G01P 15/13
[52] U.S. Cl. ........................................ 73/497; 73/514.23
[58] Field of Search ............................... 73/517 B, 497, 73/493, 514.23, 514.21, 514.17; 335/302, 304; 324/225; 336/110

[56] References Cited

U.S. PATENT DOCUMENTS

| | | | |
|---|---|---|---|
| 4,182,187 | 1/1980 | Hanson | 73/497 |
| 4,250,757 | 2/1981 | Hanson | 73/517 B |
| 4,394,405 | 7/1983 | Atherton | 427/58 |
| 4,399,700 | 8/1983 | Hanson | 73/517 B |
| 4,400,979 | 8/1983 | Hanson et al. | 73/517 B |
| 4,441,366 | 4/1984 | Hanson | 73/517 B |
| 4,555,944 | 12/1985 | Hanson et al. | 73/517 B |
| 4,555,945 | 12/1985 | Hanson | 73/517 B |
| 4,592,234 | 6/1986 | Norling | 73/517 B |
| 4,620,442 | 11/1986 | MacGugan et al. | 73/517 R |
| 4,697,455 | 10/1987 | Norling | 73/497 |
| 4,726,228 | 2/1988 | Norling | 73/517 B |
| 4,932,258 | 6/1990 | Norling | 73/497 |
| 4,944,184 | 7/1990 | Blake et al. | 73/514 |
| 5,024,089 | 6/1991 | Norling | 73/517 B |
| 5,085,079 | 2/1992 | Holdren et al. | 73/517 B |
| 5,090,243 | 2/1992 | Holdren et al. | 73/514 |
| 5,097,172 | 3/1992 | Becka | 310/348 |
| 5,111,694 | 5/1992 | Foote | 73/497 |
| 5,182,949 | 2/1993 | Rupnick et al. | 73/517 B |
| 5,203,210 | 4/1993 | Terry et al. | 73/517 B |
| 5,212,984 | 5/1993 | Norling et al. | 73/497 |
| 5,220,831 | 6/1993 | Lee | 73/497 |

FOREIGN PATENT DOCUMENTS

| | | | |
|---|---|---|---|
| 407224 | 3/1969 | Australia | 73/497 |

*Primary Examiner*—Hezron E. Williams
*Assistant Examiner*—Christine K. Oda

[57] ABSTRACT

A force rebalance accelerometer includes a proof mass suspended by one or more flexures between stationary mounted upper and lower excitation rings. Pick-off capacitance plates formed on opposing sides of the proof mass form capacitance elements whose capacitance varies in response to displacement of the proof mass to provide a displacement signal. The displacement signal is applied to one or more electromagnets, used to force the proof mass back to a null or at-rest position. The drive current applied to the electromagnets thus represents the force or acceleration applied to the accelerometer. The electromagnets include a magnet and a pole piece which forms a magnetic return path. In order to relieve stresses due to thermal expansion, the magnet is spaced apart from the pole piece to enable the bonding area to be constrained to a minimum which, in turn, reduces the overall stress on the accelerometer. In particular, a bead of relatively noncompliant epoxy is used for bonding the excitation ring and pole piece to the magnet. In order to further reduce thermal stresses, a ring of relatively compliant epoxy is disposed concentric to the noncompliant epoxy.

6 Claims, 3 Drawing Sheets

PRIOR ART

LOW STRESS MAGNET INTERFACE

CROSS REFERENCE TO RELATED APPLICATIONS

This application is a continuation-in-part of copending patent application Ser. No. 08/184,527, filed on Jan. 19, 1994.

BACKGROUND OF THE INVENTION

1. Field of the Invention

The present invention relates to an accelerometer and, more particularly, to a bonding method for reducing mechanical stress at the magnet interface of a force rebalance accelerometer which includes a proof mass suspended between one or more magnet assemblies.

2. Description of the Prior Art

Force rebalance accelerometers which include a proof mass suspended between one or more magnet assemblies are generally known in the art. Examples of such accelerometers are disclosed in U.S. Pat. Nos. 4,182,187; 4,250,757; 4,394,405; 4,399,700; 4,400,979; 4,441,366; 4,555,944; 4,555,945; 4,592,234; 4,620,442; 4,697,455; 4,726,228; 4,932,258; 4,944,184; 5,024,089; 5,085,079; 5,090,243; 5,097,172; 5,111,694; 5,182,949; 5,203,210; 5,212,984; and 5,220,831, all herein incorporated by reference. Such force rebalance accelerometers normally include a proof mass, known to be formed from amorphous quartz, suspended by one or more flexures to enable the proof mass to deflect in response to forces or accelerations along a sensitive axis, generally perpendicular to the plane of the proof mass. At rest, the proof mass is normally suspended equidistantly between upper and lower excitation rings. Electrically conductive material forming pick-off capacitance plates is disposed on opposing sides of the proof mass to form capacitive elements with the excitation rings. An acceleration or force applied along the sensitive axis causes the proof mass to deflect either upwardly or downwardly, which causes the distance between the pick-off capacitance plates and the upper and lower excitation rings to vary. This change in the distance between the pick-off capacitance plates and the upper and lower excitation rings causes a change in the capacitance of the capacitive elements. The difference in the capacitances of the capacitive elements is thus representative of the displacement of the proof mass along the sensitive axis. This displacement signal is applied to a servo system that includes one or more electromagnets which function to return the proof mass to its null or at-rest position. The magnitude of the drive currents applied to the electromagnets, in turn, is representative of the acceleration or force along the sensitive axis.

The electromagnets are known to include a magnet formed from, for example, alnico, normally bonded to an excitation ring formed from a material having relatively high permeability, such as Invar, to form a magnetic return path. The materials used for the magnet and the excitation ring will have different coefficients of thermal expansion, since the materials are different. As such, the interface defined between the magnet and the excitation ring will be subject to stress as a function of temperature. Such stress over a period of time and/or temperature degrades the performance of the accelerometer.

In order to resolve this problem, compliant epoxies have been used to bond the magnet to the excitation ring. However, such compliant epoxies degrade the long term stability of the accelerometer.

SUMMARY OF THE INVENTION

It is an object of the present invention to solve various problems associated with the prior art.

It is yet another object of the present invention to provide a force rebalance accelerometer which minimizes stress of the accelerometer due to temperature expansion without the use of a compliant epoxy.

It is yet another object of the present invention to provide a force rebalance accelerometer which provides relatively stable output over temperature and over a relatively long period of time.

Briefly, the present invention relates to a force rebalance accelerometer which includes a proof mass suspended by one or more flexures between stationary mounted upper and lower excitation rings. Pick-off capacitance plates formed on opposing sides of the proof mass are used to form capacitance elements whose capacitance varies in response to displacement of the proof mass to provide a displacement signal. The displacement signal is applied to one or more electromagnets, used to force the proof mass back to a null or at-rest position. The drive current applied to the electromagnets thus represents the force or acceleration applied to the accelerometer. The electromagnets include a magnet, rigidly secured to an excitation ring which forms a magnetic return path. In order to relieve stresses due to thermal expansion, the magnet is slightly elevated and the bonding area is constrained to a minimum. By relieving the stress at the magnet interface, the performance of the accelerometer in accordance with the present invention will be relatively stable over time.

BRIEF DESCRIPTION OF THE DRAWING

These and other objects of the present invention will be readily understood with reference to the following detailed description and attached drawing, wherein.

DETAILED DESCRIPTION OF THE PREFERRED EMBODIMENT

Figure 1:
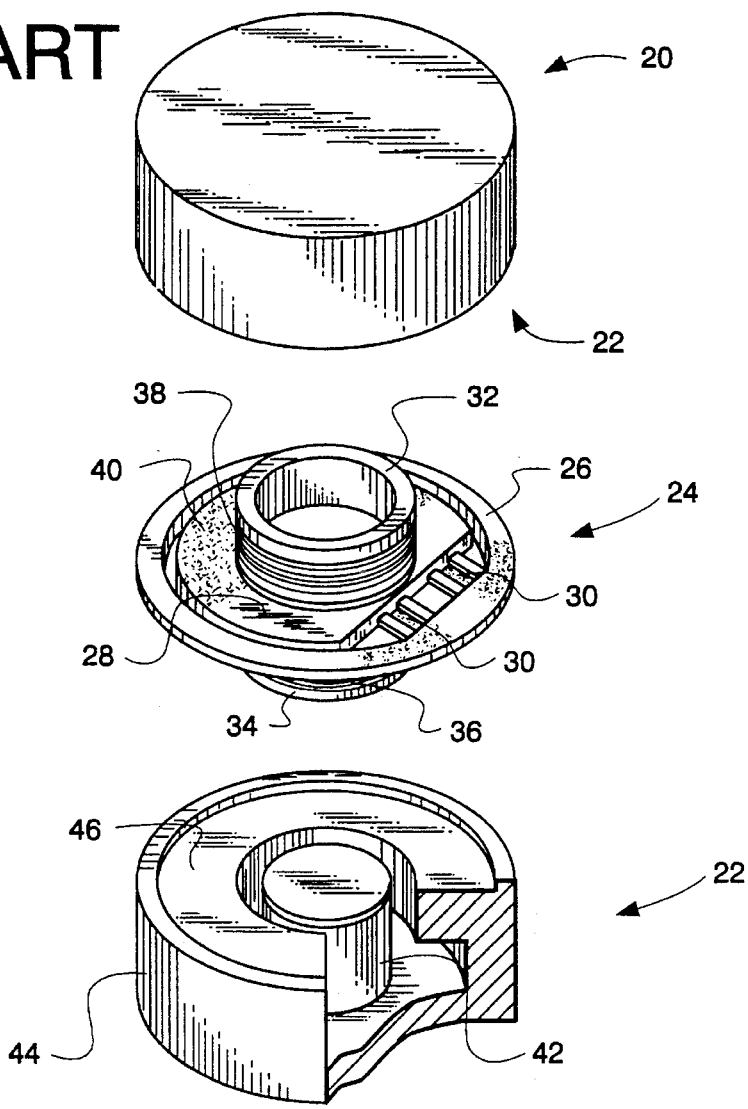
FIG. 1 is an exploded perspective view of a known force rebalance accelerometer.

FIG. 1 illustrates a known force rebalance accelerometer, generally identified with the reference numeral 20. The force rebalance accelerometer includes one or more magnet assemblies 22 and a proof mass assembly 24. The proof mass assembly 24 includes a mounting ring 26 and a generally paddle-shaped proof mass 28. The proof mass 28 is suspended relative to the mounting ring 26 by way of a pair of flexures 30 to enable the proof mass 28 to rotate relative to the mounting ring 26. Cylindrically shaped bobbins 32 and 34 are formed on opposing surfaces of the proof mass 28. The bobbins 32 and 34 are used to carry torquer coils 36 and 38. Conductive material 40 is deposited on the opposing surfaces of the proof mass 28 to form pick-off capacitance plates.

The magnet assemblies 22 include a permanent magnet 42 and a generally cylindrical excitation ring or flux concentrator 44. The excitation ring 44 is configured to have a generally C-shaped cross section. The material for the excitation ring 44 is selected to have relatively high permeability, such as Invar, to form a magnetic return path. Inwardly facing surfaces 46 on the excitation rings 44 form in combination with the conductive material 40 on the opposing sides of the proof mass 28 to form variable capacitance elements PO1 and PO2 as shown in FIG. 2.

Figure 2:
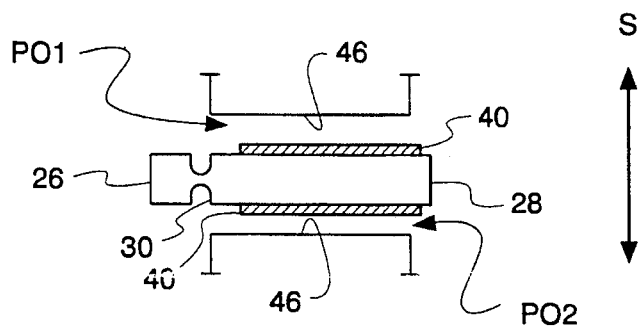
FIG. 2 is a simplified cross-sectional view of a known force rebalance accelerometer.

Referring to FIG. 2, the proof mass 28 is shown at an at-rest or null position. In this position, the distance between the surfaces 46 of the upper and lower excitation rings 44 and the pick-off capacitance plates 40 are equal. Since capacitance is a function of the distance between the plates, the capacitance values of the capacitors PO1 and PO2 are equal during this condition.

In response to an acceleration or force along a sensitive axis S, generally perpendicular to the plane of the proof mass 28, the proof mass 28 moves toward one or the other of the excitation rings 44. This displacement of the proof mass 28 changes the respective distances between the surfaces on the pick-off capacitance plates 40 formed on the opposing sides of the proof mass 28 relative to the upper and lower excitation rings 44. This change in the distance results in a change in the capacitance of the capacitive elements PO1 and PO2. Circuitry for measuring this change in capacitance is disclosed in U.S. Pat. No. 4,634,965 and copending application Ser. No. 08/151,417, filed on Nov. 12, 1993, and issued on Mar. 21, 1995 as U.S. Pat. No. 5,399,980 by Paul W. Rashford and entitled "IMPROVEMENT OF CHARGE BALANCE CIRCUIT" and incorporated herein by reference.

The difference in the values of the capacitors PO1 and PO2 is representative of the displacement of the proof mass 28 either upwardly or downwardly along the sensitive axis S. This displacement signal is applied to a servo system which includes the magnet assemblies 22 and the torquer coils 36 and 38 which form electromagnets to return the proof mass 28 to its null position. The magnitude of the drive current to the electromagnets is a measure of the acceleration of the proof mass 28 along the sensitive axis S.

The magnet assembly 60, in accordance with the present invention, and generally identified with the reference numeral 60 (FIG. 3), solves these problems. The magnet assembly 60 includes an excitation ring 61, a magnet 42 and a pole piece 62. The excitation ring 61 is formed in a generally cylindrical shape with a C cross section. The magnet 42 having opposing bonding surfaces 63 is centrally secured to a base portion 64 of the excitation ring 61. As mentioned above, known force rebalance accelerometers include a magnet assembly which includes an excitation ring bonded to the entire bonding surface of the magnet. Additionally, a pole piece may be bonded to an opposing surface of the magnet. Due to the difference in materials used for the magnet, the pole piece and the excitation ring, the differing rates of thermal expansion cause stress at the magnet to excitation ring interface and the magnet to pole piece interface. This stress produces distortion in the excitation ring and the pole piece, which degrades performance. Since the magnet is normally bonded to the excitation ring with an epoxy, such stress also weakens the bonding over time and, as such, degrades the performance of the accelerometer.

The magnet assembly 60, in accordance with the present invention, is formed such that the magnet 42 is spaced apart from the base portion 64 of the excitation ring 61 by a relatively small gap 65. In order to minimize the stress due to thermal expansion, the bonding material 66 is constrained to a minimum as shown in FIG. 3, forming a pedestal to cover a relatively small portion of the bottom surface area 63 of the magnet 42.

The pole piece 62 may be bonded to the other pole piece or bonding surface 63 of the magnet 42 to form the magnet assembly 60. In order to reduce stress due to temperature at this interface, the pole piece 62 is bonded only to a small portion of the bonding surface 63 of the magnet 42.

Since the bonding material 66 is non-magnetic, the addition of the air gap 65 has little effect on the magnetic circuit. In addition, by minimizing the bonding area, the overall stress is significantly reduced, thus providing an accelerometer with a relatively stable output over time.

Figure 3:
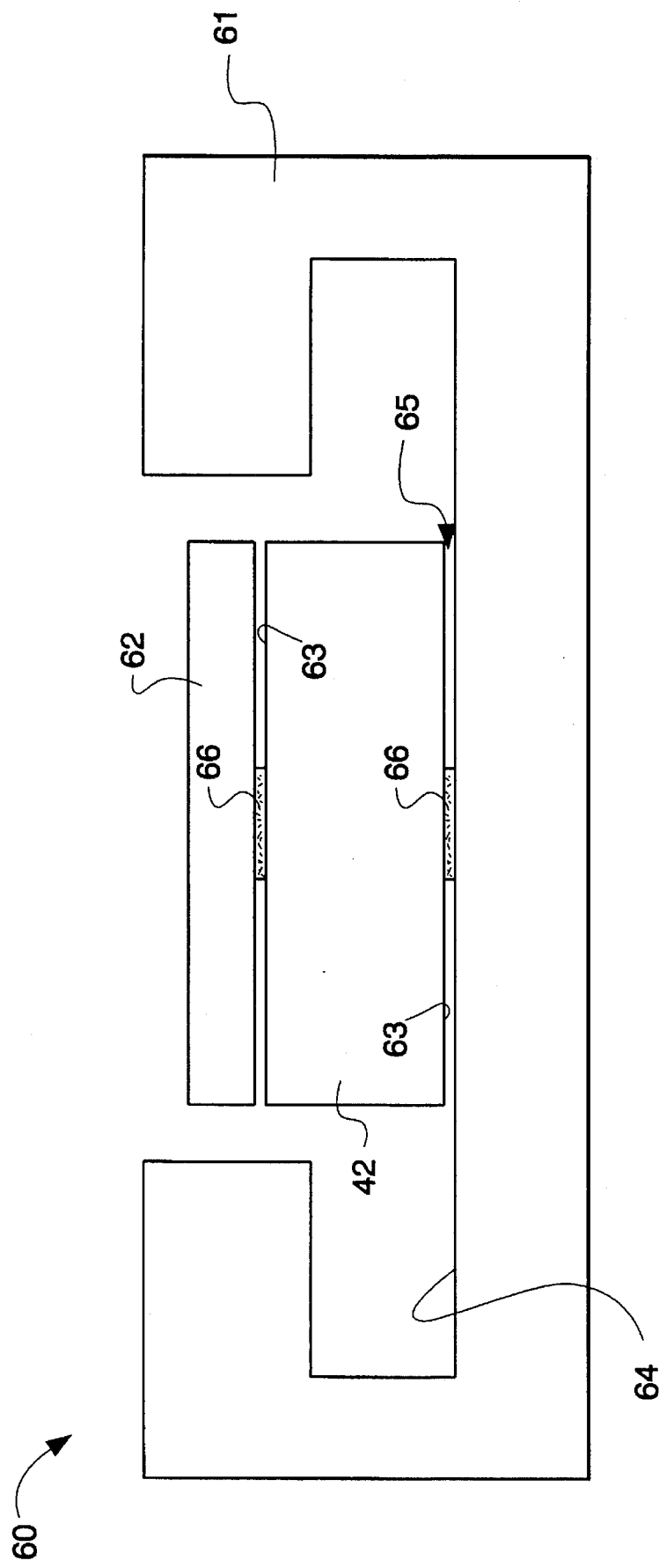
FIG. 3 is a partial cross-sectional view of a magnet assembly in accordance with the present invention.
Figure 4:
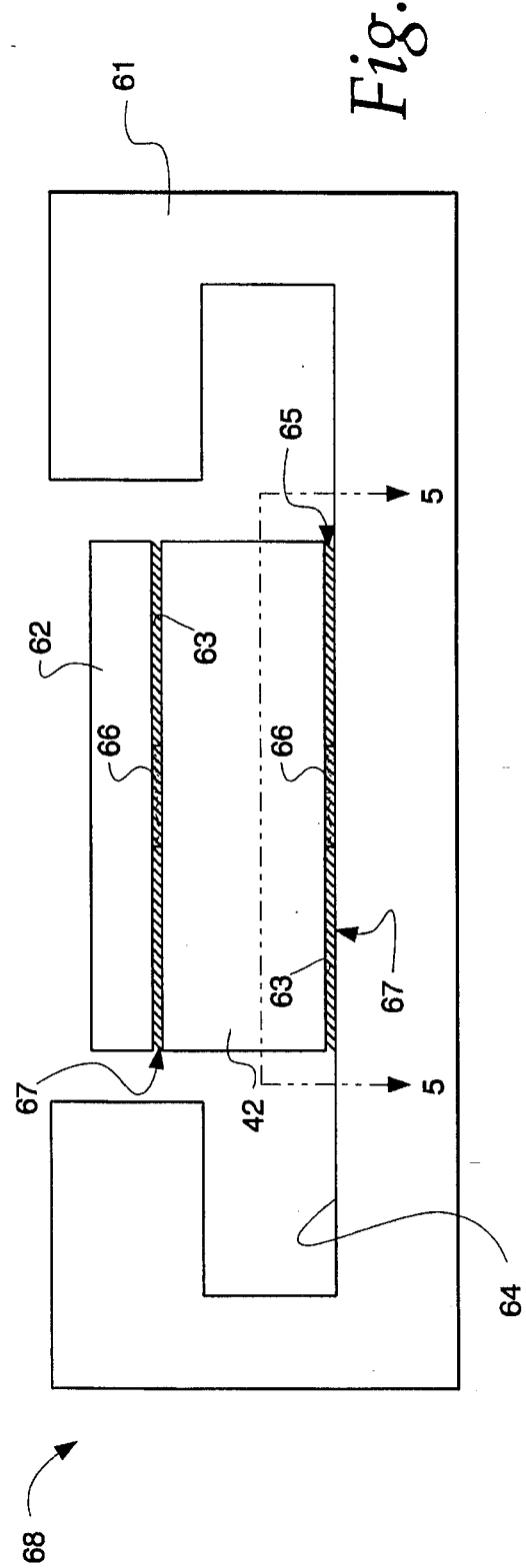
FIG. 4 is an alternative embodiment of the magnet assembly illustrated in FIG. 3.
Figure 5:
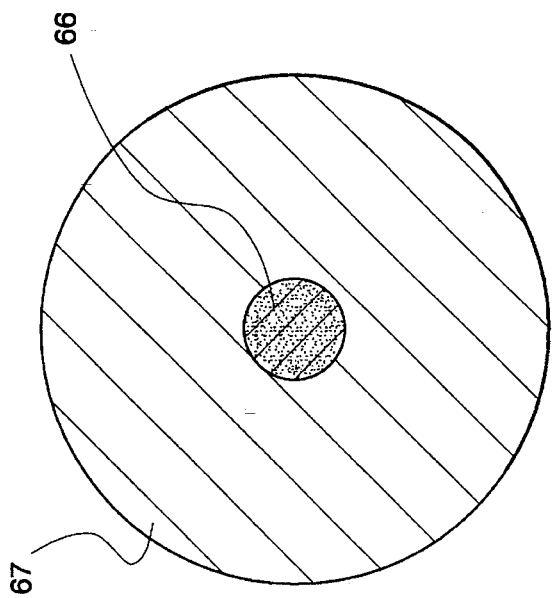
FIG. 5 is a cross-sectional view along line 5—5 of FIG. 4.

An alternative embodiment of the invention, generally identified with the reference numeral 68, is illustrated in FIGS. 4 and 5, wherein like components are identified with the same reference numerals as in FIG. 3. The alternative embodiment is similar to the embodiment illustrated in FIG. 3 and described above, with the exception of an additional ring of compliant epoxy 67. The ring of compliant epoxy 67 is disposed around the bead of bonding material 66, formed from noncompliant epoxy, as best shown in FIG. 5. Such a configuration provides several advantages over the embodiment illustrated in FIG. 3. For example, the thermal stresses at the interfaces defined between the magnet 42, the pole piece 62 and the excitation ring 61 are greatly reduced. In particular, as discussed above, such thermal stresses result from the different coefficients of thermal expansion for the excitation ring 61 and pole piece 62 and magnet 42, due to the fact that these components are made from different materials. As discussed above, the relatively noncompliant epoxy 66 is constrained to a minimum to reduce thermal stress at the interfaces. By applying a ring of compliant epoxy material 67 concentric to the bead of noncompliant epoxy material 66, the thermal stresses are further reduced by the compliance of the epoxy 67. The concentric ring of compliant epoxy 67 also provides additional benefits. In particular, by filling the gap 65 at the interfaces defined between the magnet 42, excitation ring 61 and pole piece 62, the relative strength of the joint between the components is enhanced and made relatively more stable, relative to the embodiment illustrated in FIG. 3.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A force rebalance accelerometer, comprising:

a proof mass;

a mounting ring;

a pair of flexures for flexibly connecting the proof mass to the mounting ring;

means for returning the proof mass to a null position, said returning means including a permanent magnet having opposing bonding surfaces and one or more excitation rings, one surface of said magnet spaced adjacent to one of said excitation rings;

means for bonding said one of said bonding surfaces of said magnet to one of said excitation rings, said bonding means including means for spacing said bonding surface of said magnet, from said one of said excitation rings forming a pedestal and defining an interface; and means for compensating for thermal stress at said interface.

2. A force rebalance accelerometer as recited in claim 1, wherein said spacing means includes a noncompliant epoxy which covers a predetermined portion of said bonding surface.

3. A force rebalance accelerometer as recited in claim 1, wherein said compensating means includes a compliant epoxy.

4. A force rebalance accelerometer as recited in claim 3, wherein said compliant epoxy is formed in the shape of a ring and disposed concentric relative to said noncompliant epoxy.

5. A force rebalance accelerometer as recited in claim 4, further including a pole piece and means for bonding said pole piece to said bonding surfaces of said magnet, defining a second interface.

6. A force rebalance accelerometer as recited in claim 5, wherein said bonding means includes means for reducing the stress due to temperature at said second interface.

* * * * *